Figure 1:
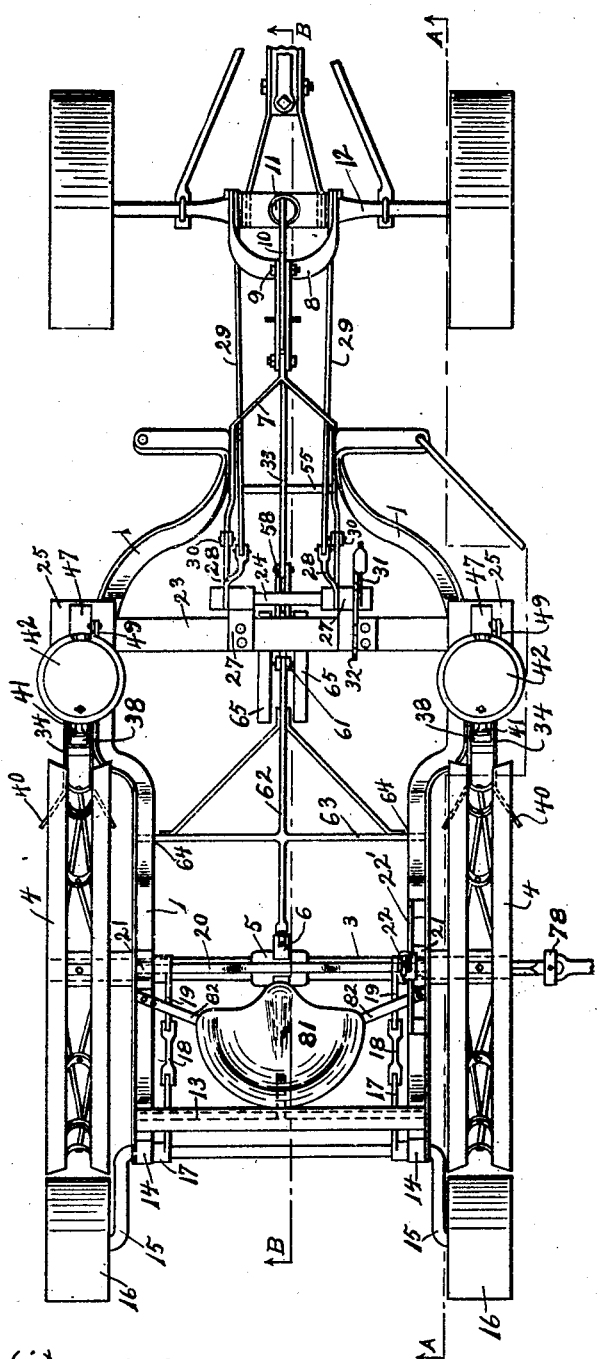

H. N. RANDALL.
CORN PLANTER.
APPLICATION FILED JUNE 25, 1907.

913,234.

Patented Feb. 23, 1909.
5 SHEETS—SHEET 1.

Witnesses

Inventor
Horace N. Randall

H. N. RANDALL.
CORN PLANTER.
APPLICATION FILED JUNE 25, 1907.

913,234.

Patented Feb. 23, 1909.
5 SHEETS—SHEET 2.

Witnesses
P. R. Thompson
F. E. Hufnail

Inventor
Horace N. Randall

H. N. RANDALL.
CORN PLANTER.
APPLICATION FILED JUNE 25, 1907.

913,234.

Patented Feb. 23, 1909.
5 SHEETS—SHEET 3.

Witnesses
P. R. Thompson.
F. E. Hufnail

Inventor
Horace N. Randall

H. N. RANDALL.
CORN PLANTER.
APPLICATION FILED JUNE 25, 1907.
913,234.
Patented Feb. 23, 1909.
5 SHEETS—SHEET 5.
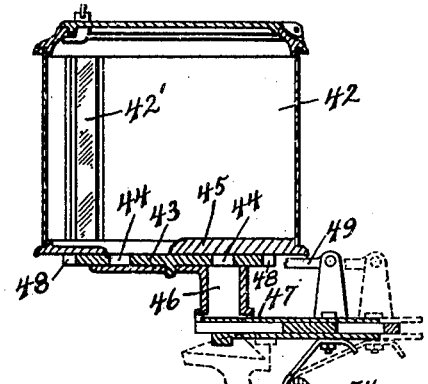
Fig. 5.
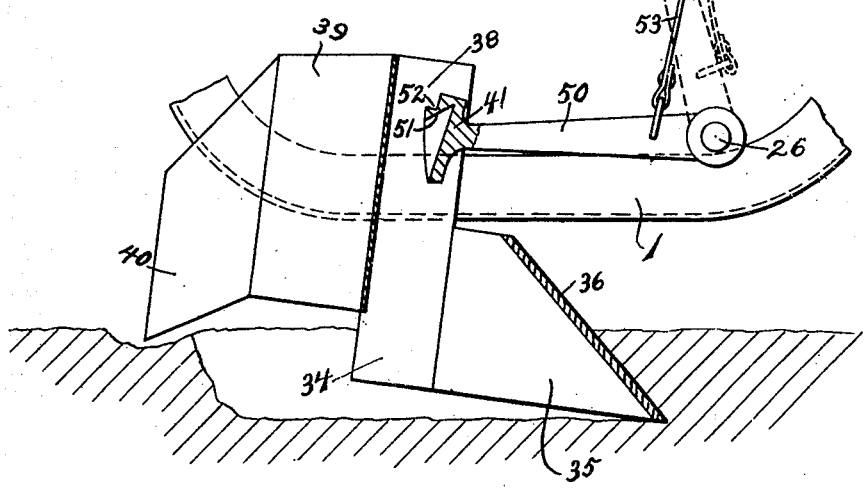
Fig. 6
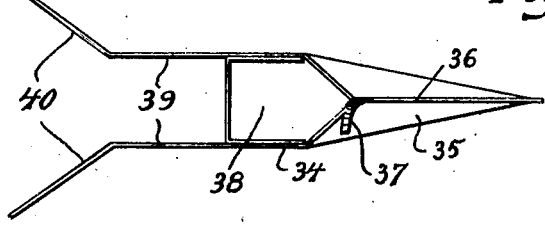
Witnesses
O. W. Thompson.
J. E. Hufnail
Inventor
Horace N. Randall

UNITED STATES PATENT OFFICE.

HORACE N. RANDALL, OF MINNEAPOLIS, MINNESOTA.

CORN-PLANTER.

No. 913,234.          Specification of Letters Patent.          Patented Feb. 23, 1909.

Application filed June 25, 1907. Serial No. 380,827.

*To all whom it may concern:*

Be it known that I, HORACE N. RANDALL, a citizen of the United States, residing at Minneapolis, in the county of Hennepin and State of Minnesota, have invented certain new and useful Improvements in Corn-Planters, of which the following is a specification.

My invention relates to planters, and is in the nature of an improvement on the machine set forth and claimed in my prior patents #619,345, Feb. 14th, 1899, and #658,803 Oct. 2nd, 1900, entitled corn planters; which prior machines and my present improvement are especially designed and particularly adapted for planting corn. In the devices of this character now in general use, a wire or line is extended across the field, said wire being provided with protuberating nobs at spaced intervals adapted to operate the seed containing mechanism. Of the many difficulties incidental to the use of these devices, it is found that the wire forms a useless item of expense, is frequently subject to repairs which incur a considerable loss of time, and seldom operates with the requisite degree of accuracy.

In my present invention, as in the prior patents above mentioned, I provide a mechanism embodying self-contained means for operating the counter device, and means for indicating the position of the planted hills, also means for rectifying any errors or inaccuracies according to the will of the operator, whereby the hills may be thus deposited in uniformly rectilinear alinement, thus obviating the use of the usual wire and its objectionable characteristics.

I have herewith shown an indicator device that is an improvement over the similar devices set forth in my previous patents, in which the oscillatory indicator lever describes a downward stroke simultaneously with the downward stroke of the seed delivery shuttle; whereas in the former devices, the indicator lever described its downward strokes in unison with the upward strokes of the seed delivery shuttle. With this improvement, the operator may more readily discover any error of the timing mechanism and correct same.

My present furrow forming shoe is provided with suitable graders adapted to thrust aside all roots, stubble, etc., brought up from the soil, thus obviating the great difficulty commonly encountered by the accumulation of litter collected by the heel of the shoe, also leaving a graded path for the traction wheels. I also supply the seed magazine with a glass in the side so placed that the amount of seed contained therein is continuously apparent to the operator, also enabling him to tell if the counter is working properly or not.

To enable those skilled in the art to which my invention relates, to more clearly comprehend the merits thereof and its method of operation, a specific embodiment of my invention and its improvements is fully set forth in the following specification and illustrated in the accompanying drawings, the actual scope of my invention being more particularly pointed out in the subjoined claims.

Figure 2:
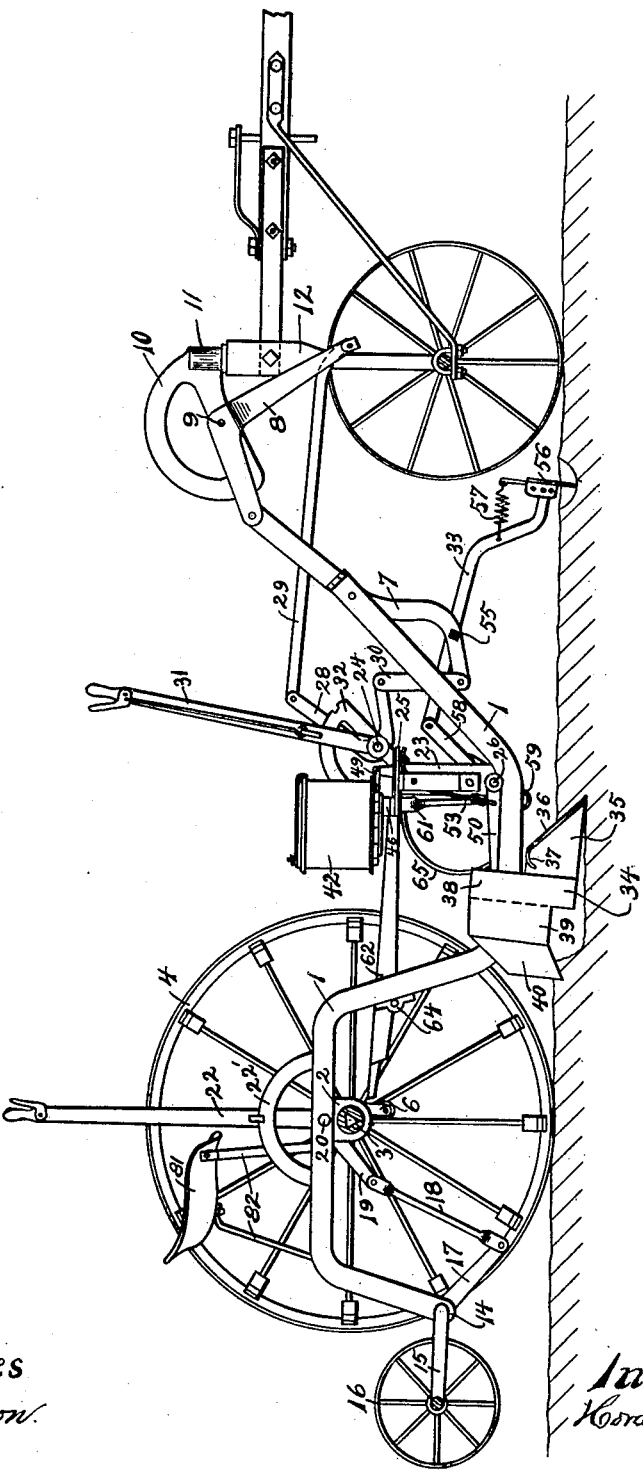
Figure 3:
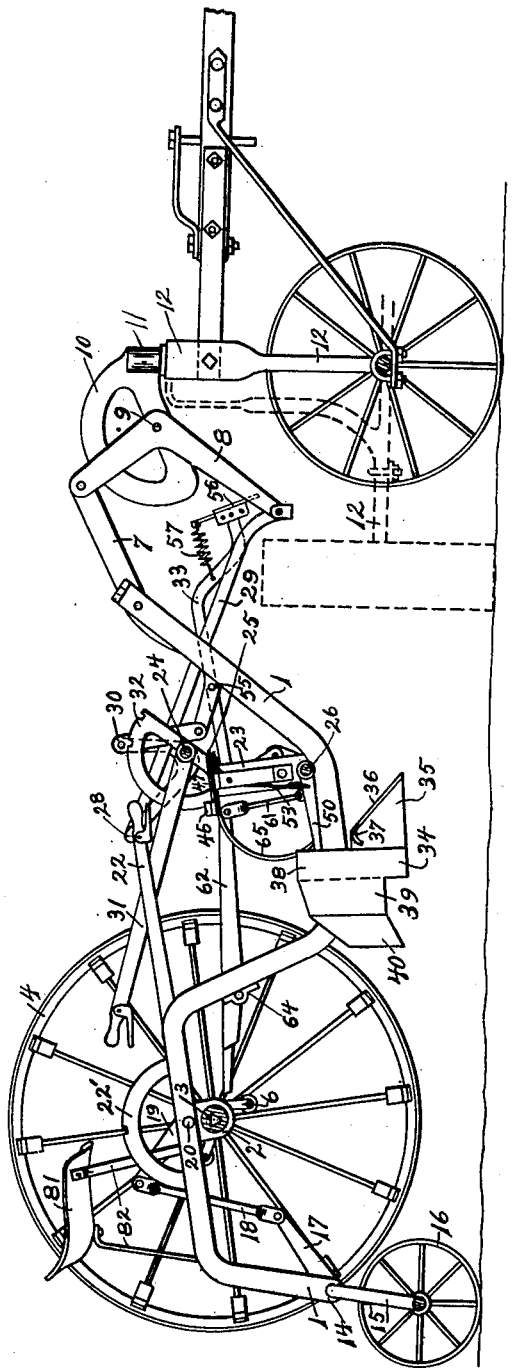
Figure 4:
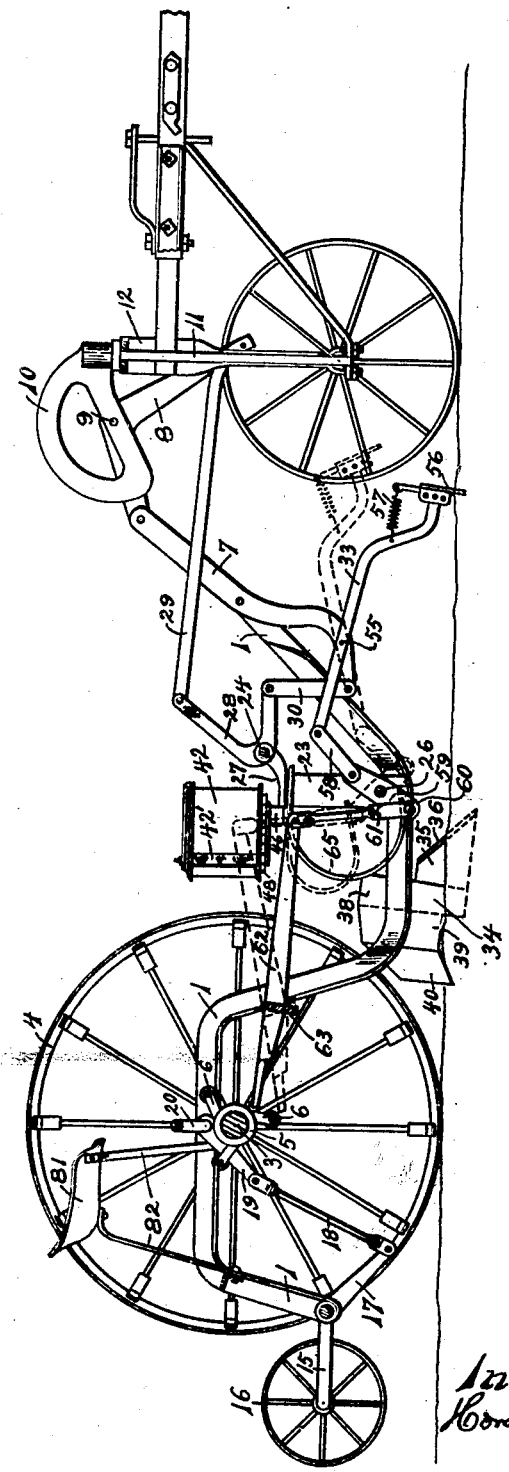

In the drawings:—Figure 1 is a plan view showing a complete planter mechanism embodying my invention. Fig. 2 is an approximate longitudinal section taken on the line A—A of Fig. 1, showing an elevation of the machine in planting position. Fig. 3 is an approximate longitudinal section also taken on line A—A of Fig. 1, but showing the traction wheels and seeding mechanism raised in a disengaged position from the ground. Fig. 4 is a longitudinal section taken on line B—B of Fig. 1 showing the indicator mechanism during operation. Fig. 5 is an enlarged detail of shuttle or conveying devices showing the seed magazine and shoe in section and Fig. 6 is a detail of the shoe in plan view.

Referring to the drawings in detail, the main frame of the machine 1 is preferably made of angle iron, but may be of any suitable material, and is of the configuration hereinafter set forth. At the sides of the frame 1 are provided the bearings 2 in which the driving axle 3 is rotatably mounted. This driving axle 3 is provided at its extreme portions with traction wheels 4 rigidly secured thereon, and at its intermediate portion with a cam 5 rigidly secured thereto, having a plurality (as shown three) of trip arms or projections 6, the purpose of which will be hereinafter apparent. The sides of the main frame 1, are, at their forward ends, pivotally secured to the intermediate portion of a U clevis 7, which is pivoted at its forward end to the upper arm of a bell crank 8, which in turn is pivoted at its elbow by a bolt or pin 9 to a segmental bracket 10. The segmental bracket 10 forms the head of an extended king bolt 11, of the forward truck 12, upon which is mounted the pole. The truck 12 is thus mounted with freedom for pivotal movements in a horizontal plane on the axis of the king bolt 11 and in a vertical plane on the bolt 9, said truck being adapted to support the forward portion of the frame 1.

The rear ends of the sides of main frame 1 are joined together by means of a brace 13, and are provided with bearings 14 in which is rotatably mounted a transverse shaft 15, the ends of which are offset providing crank arms, the end portions of which extend parallel to the shaft 15 and provide bearings for the wheels 16 which are loosely mounted thereon. The arms 17 are rigidly secured upon the shaft 15 and are connected by links 18 to the arms 19 which are rigidly secured upon the rock shaft 20. Said rock shaft 20 is loosely mounted in the bearings 21 of the main frame 1 and extends transversely thereof and is provided with an operating lever 22 by means of which the shaft may be turned. Any desired attachment may be provided for securing the lever 22 in a position, such as the notched lock segment 22' which is conveniently mounted upon the main frame 1. The wheels 16 are somewhat smaller in diameter than the wheels 4, but are preferably of the same width of tire, and serve to raise the rear end of the machine from the ground, thus allowing wheels 4 to revolve axle 3 to readjust the time of drop. This also provides a convenient means for carrying the machine while turning at the ends of the field for return trip, and while being transported from place to place. Thus by moving lever 22, the motion being transmitted through shaft 20, arms 19, links 18 to arms 17, and through shaft 15 to wheels 16, wheels 16 can be moved from a position shown in Fig. 2 to a position shown in Fig. 3, elevating the rear portion of the main frame 1, and raising the wheels 4 from the ground for the purpose above stated, the whole being held rigidly in place by means of lock segment 22'.

The bar 23 is rigidly secured transversely to an intermediate portion of the main frame 1, and is of suitable form to support a transverse rock shaft 24, brackets 25, and shuttle shaft 26. Said rock shaft 24 is mounted in the bearings 27 and carries one or more bell cranks 28 which are rigidly secured thereto. The tension rods or links 29 join the upper arms of the bell cranks 28 to the lower arms of the bell crank 8, the lower arms of the bell cranks 28 are attached through links 30 to the lower end of the U clevis 7 by means of pins or bolts. The rock shaft 24 is operated by a lever 31 which is rigidly mounted thereon adjacent to a lock segment 32, which is rigidly secured to the bar 23 and which serves to hold the lever 31 in any desired position by any approved method of locking. I am thus enabled to considerably shorten the total length of the machine, however, providing a front truck 12 of the same gage as the traction wheels 4, and adapted to pass under the indicator or marker 33 which is pivoted to the U clevis 7 and therefore raised with it. This makes a desirable improvement in the operation of my device, and the wheels of truck 12 coact with certain graders which will be hereinafter described, producing a uniformly smooth surfaced path for the traction wheels 4, also spacing for indicator or marker on opposite trip.

As this is a double row planter, the seed magazines, furrow forming shoes, and seed delivery devices are arranged in duplicate on opposite sides of machine in longitudinal alinement with the traction wheels and are simultaneously operated from a common impelling source which in the present construction is the trip hub or cam 5.

The furrow forming shoes are indicated as entireties by the numerals 34 and are secured to the main frame 1 in alinement with, and just ahead of the traction wheels 4. The forward portions 35 of shoe 34 are approximately wedge shaped as is shown in Figs. 5 and 6, and are thus adapted to form the furrow in which the seed is deposited. Said shoes are so secured to main frame 1 that the forward point of wedge shaped portion, is lower than the rest of said shoes, so that all roots, stubble, etc., are forced up to the surface over the upwardly inclined top edge 36 of said wedge shaped portion. A curved horn 37 is provided near the top thereof and is adapted to turn aside all weeds, etc. brought to the surface by the shoe, thus keeping the furrow free from all litter which might enter either from above or below. In the formation of said shoes, rearwardly projecting side flanges 39 are provided for the purpose of keeping the displaced dirt from falling back into the furrow until after the corn has been deposited at the bottom thereof. The rear portions of these side flanges are trimmed and bent to form the graders 40 in front of the traction wheels 4. At an intermediate point in said shoe substantially between these rearwardly projecting flanges is a seed delivery tube 38 furnishing a vertical passage for the seed from the shuttle 41, to the bottom of the furrow.

The seed magazines or hoppers 42, are each provided with a glass 42' arranged in the sides nearest to the seat, whereby the operator may at any time see the amount of seed contained therein. These magazines are secured to opposite sides of the machine, preferably to the bar 23 as shown. The bottoms of these magazines are each provided with a rotary disk or counter 43 supplied with perforations 44 into which the seed may drop and be carried by said disk 43 under a suitable scraper or cut off 45 which serves to clear all surplus kernels or corn from said disk 43, only those kernels contained in perforations 44 to be carried to, and dropped down the spout 46 to the table 47. The outward edge of disk 43 is provided with ratchet teeth 48, one for each perforation 44, and arranged to be engaged by a pawl 49, shown broken away in Fig. 5, carried by the table 47. Said table 47 is mounted movably in a slot provided in the bracket 25, which is bolted to bar 23, and serves to support the seed magazine 42 and table 47 in vertical alinement with the tube 38 of shoe 34.

Mounted rigidly upon shaft 26 in line with the table 47 of the magazine 42, and the tube 38 of shoe 34 is a vibrating arm 50 carrying a shuttle or seed delivery head 41 moving in vertical planes longitudinally of the machine. The shuttles 41 are substantially the same as described in my prior patents having forwardly inclined rear walls 51, serving to retain the kernels of corn in the shuttle head while it is describing a downward stroke, and the notches 52 are provided in the rear end to engage the table 47 and force the same forward, allowing seed to be transferred from table 47 into shuttle head in position shown in Fig. 5 by dotted lines, the table 47 is normally held in position as shown by full lines in Fig. 5, until forced by the shuttle head 41 to take the position shown by dotted lines in Fig. 5, it carries the pawl 49 forward to engage the next tooth of the ratchet 48 ready to move said ratchet 48 and disk 43 around one notch upon its return. The table 47 is connected, by means of a strap or other flexible link 53, to the shuttle arm 50, whereby a downward stroke of the shuttle arm will draw the table 47, by the strap 53 acting over a roller 54, to a position as is shown in Fig. 5, thus closing the bottom of the spout 46, and simultaneously moving the disk 43 around one hole by means of the ratchet 48 and pawl 49, whereby the next charge may drop through the spout 46 to the table 47.

In Fig. 4 is shown the two positions taken by indicator or marker 33 while in operation and the mechanism necessary to produce the required motion. Indicator 33 consists of a bar pivoted at its intermediate portion to the U clevis 7 by means of a bolt or pin 55 and provided at its forward end with a hinged or pivoted blade 56, so arranged that when indicator 33 is at its lowest point the lower portion of blade 56, which would then be on the ground, may bend or oscillate rearwardly in opposition to the tension of spring 57, allowing blade 56 to drag easily over the ground as the machine moves forward. The rear end of indicator 33 is pivotally connected by means of link 58 to one end of arm 59 which is rigidly secured at its intermediate portion to the shuttle shaft 26.

The other end of arm 59 is pivotally secured to a link 61 by means of a pin 60 said link 61 is secured to a trip lever 62, which in turn is pivoted at its intermediate portion on frame 1 by means of a transverse bar 63 rocking in bearings 64 which are provided in said main frame. The rear end of the trip lever 62 is adapted to be engaged by the arms 6 of the cam 5. Rigidly attached to bar 23, preferably one on each side of the link 61, are springs 65, the opposite ends of which bear on pin 60, and are adapted to normally hold the arm 59, the shaft 26, the indicator, etc., substantially in the position shown in full lines in Fig. 4, and the shuttle arm 50, in the position shown by full lines in Fig. 5. The distance between blade 56, of indicator 33, and the seed delivery tubes 38, of the shoes, 34, is the same as that between the hills of corn as planted, and as indicator blade 56, is brought in contact with the ground at the same time that the deposit is made, it indicates to the operator a spot exactly in a transverse line with the next deposit to be made.

In this machine the seat 81 is rigidly secured to the main frame 1 by means of braces 82 which gives easy access to the seat from front and rear and places the seat in the most convenient position for the operation of the levers 22 and 31.

Operation: In the operation of the machine above described, attention is called to Fig. 2 which shows the machine in planting position, in which the trip lever 62 is free from the arm 6 of the cam 5 and the springs 65 holds the shuttles 41 and indicator 33 in their normal positions. As the machine moves forward the arm 6 of the cam 5 strikes and depresses the rear portion of the trip lever 62 causing it to oscillate upon the pivot 64 thereby raising the link 61 and revolving the arm 59 and shaft 26 about one fourth turn raising the shuttle 41 and indicator 33 all against the action of the springs 65, substantially as is shown by dotted lines in Fig. 4. At this point the notches 52 of the shuttles 41 engage the tables 47 forcing them forward, thus transferring the seeds from the tables 47 into the shuttles 41, and carrying the pawls 49 forward to engage the next tooth of ratchet 48. When the arm 6 of cam 5 has passed by the lever 62, the springs 65 return the whole to normal position, whereby the blade 56 of indicator 33 is brought in contact with the ground, the operator having so set the machine that the indication made by the blade 56 will be in transverse alinement with the corresponding marks made upon previous trips. By a reciprocating quarter revolution action the shuttles 41 carries seed received from the tables 47 to the position shown in Fig. 5, however, this action is very rapid whereby the seed is precipitated down through the delivery tubes 38 of shoes 34 to the bottom of the furrow. As the shuttle arm 50 is thus thrown to its lower most position by springs 65, the table 47 is drawn back by means of the flexible link 53 to the position as shown by full lines in Fig. 5, closing the bottom of spout 46, and at the same time moving disk 43 around one hole by means of the flexible link 53 to the position as shown by full lines in Fig. 5, closing the bottom of spout 46, and at the same time moving disk 43 around one hole by means of ratchet 48 and pawl 49 dropping the next counted charge of seed upon the table 47. This action of the disk 43 tends to agitate the seed held in the magazine 42 and this agitation can be seen by the operator through the glass 42', thereby informing him when the disk or counter 43 is working properly. The traction wheels 4 follow closely after the furrow forming shoes 34 and close furrows over the deposited corn.

In case the machine gets out of time with respect to the transverse rows previously planted it is easily noted by the operator who may find by means of indicator blade 56 that the machine is planting the hills too soon or too late to bring them in transverse line with the previously planted rows of hills. The machine, by my present invention, can be properly reset so as to bring these hills or rows into transverse line in a manner similar to that set forth in my prior patent wherein the traction wheels 4 are raised from the ground and are then turned backward or forward to give the proper adjustment. The raising of the traction wheels is accomplished in my present invention with greater ease than in my prior patent. The operator without moving from his seat, moves the lever 22 from the position shown in Fig. 2 to the position shown in Fig. 3, thereby rocking the shaft 15 until the wheels 16 are brought to a position on the ground raising the rear end of the main frame 1 and the traction wheels 4, as shown in Fig. 3.

At the ends of the trips across the field or whenever it is necessary to turn the machine around, the operator manipulates the lever 31, which operates the bell cranks 28, the links 29 and 30, the U clevis 7, and the bell crank 8, thus raising the front end of main frame 1 to a position as shown in Fig. 3, which allows the wheels of the front truck 12 to pass under the indicator and the forward portion of the main frame. As this is done separately from the lifting of the traction wheels both are accomplished with much greater ease than in my prior machine. When machine is to be moved from one place to another both of these lifts are operated and the machine can then be moved about with freedom on wheels 16 and truck 12.

It is obvious from the foregoing that modifications could be effected without departing from the true and original purport of my invention. Therefore, I do not wish to confine myself to the details of construction herein shown.

Having thus described my invention, what I claim and desire to secure by Letters Patent of the United States, is the following:

1. In a planter, the combination with a seed magazine or receptacle and mechanism for depositing the seed in the ground, of a short stroke hill indicator adapted to indicate the transverse relations of the hills planted, and means for operating said indicator whereby a downward stroke is made simultaneously with the downwardly deposit of each seed hill, thereby indicating the relative transverse positions of the succeeding pairs of hills, substantially as set forth.

2. In a planter, the combination with a seed magazine or receptacle and a vibrating shuttle coacting therewith to deposit seed in individual hills, of a short stroke hill indicator adapted to indicate the transverse relation of the planted hills and comprising a substantially horizontal lever pivotally secured to the planter frame and a transverse indicator blade resiliently mounted upon its forward end, and means for operating said hill indicator whereby the indicator blade will describe a downward stroke simultaneously with the downward stroke of the shuttle, substantially as set forth.

3. In a planter, the combination with a seed magazine or receptacle, of a vibrating shuttle adapted to convey the seed from said magazine to the ground, a short stroke hill indicator comprising a reciprocating lever and a resilient indicator blade at its forward end, and means for impelling said mechanism whereby said indicator blade will describe a downward stroke simultaneously with each downward stroke of said shuttle, substantially as set forth.

4. In a planter, the combination with the trucks, frame, and seed magazines, of a short stroke hill indicator pivotally secured in said frame, a rocker shaft transversely mounted in said frame, vibrating shuttles mounted upon said rocker shaft, a spring controlled operating lever centrally mounted upon said rocker shaft and rigidly secured thereon, a link connecting one end of said lever to a trip lever, a cam mounted upon the rear axle adapted to impart an oscillatory movement to said trip lever, and a link connecting the other end of said operating lever with the short stroke hill indicator whereby a downward stroke of the short stroke hill indicator will be made simultaneously with each downward stroke of the shuttles, substantially as set forth.

5. In a planter, the combination with a rear truck and planting mechanism mounted thereon and impelled by the traction wheels thereof; of a hill indicator embodying an arm operated by said planting mechanism and extending forwardly therefrom, a front truck, a jointed frame extending from said rear truck to said front truck, and a compound system of links and levers by which a single operating lever is adapted to raise the planter mechanism from engagement with the ground and producing a greater elevation of the indicator whereby the front truck may swing to any desired position without interfering therewith, substantially as set forth.

6. In a planter, the combination with a front truck, a rear truck, and a planting mechanism; of a main frame extending from said forward truck to said rear truck and supporting said planter mechanism, said main frame being provided with a U clevis forming the forward portion of said frame; a bell crank 8 suitably mounted upon said front truck the upper arm of which pivotally supports the fore arm of said U clevis; a bell crank 28 mounted upon a transverse rocker shaft; an operating lever mounted upon said shaft adapted to operate said bell crank 28; a link extending from the upper arm of bell crank 28 to the lower arm of bell crank 8; and a link extending from the lower arm of bell crank 28; to the lower portion of the U clevis, substantially as set forth.

7. In a planter, the combination with a front truck, a rear truck and a seeding mechanism; of a jointed main frame extending from said front truck to said rear truck and supporting said seeding mechanism; a U clevis pivotally jointed to and forming the forward portion of said main frame; a pair of oppositely arranged bell cranks operatively engaging said U clevis; a link joining said bell cranks whereby they are adapted to jointly raise the U clevis, the forward portion of the main frame, and the seeding mechanism; and a lever adapted to operate said bell cranks, substantially as set forth.

8. In a planter, the combination of a main frame; a rear truck and a front truck supporting said main frame; a seeding mechanism supported upon the intermediate portion of said main frame and impelled by said rear truck; means for elevating or lowering said seeding mechanism and the forward portion of the main frame; and means whereby the rear truck may be elevated from engagement with the ground by a single movement of a hand lever, substantially as set forth.

9. In a planter, the combination with a main frame, front and rear trucks, and seeding mechanism impelled from said rear truck; of a supplemental rear truck comprising a rock-shaft mounted in said main frame, arms extending radially therefrom, wheels carried by said arms adapted to support the main frame and elevate the rear trucks from engagement with the ground; a hand lever mounted upon said main frame; and connections between said hand lever and said supplemental rear truck whereby a single movement of said hand lever from a vertical to a horizontal position will cause the main frame and rear truck to be elevated and supported upon said supplemental rear truck, substantially as set forth.

In testimony whereof I have signed my name to this specification in the presence of two subscribing witnesses.

HORACE N. RANDALL.

Witnesses:
    F. E. HUFNAIL,
    PAUL R. THOMPSON.